(12) United States Patent
McCallister

(10) Patent No.: US 7,251,463 B2
(45) Date of Patent: Jul. 31, 2007

(54) METHODS AND APPARATUS FOR CONTROLLING SIGNALS

(75) Inventor: Ronald D. McCallister, Scottsdale, AZ (US)

(73) Assignee: CrestCom, Inc., Scottsdale, AZ (US)

( * ) Notice: Subject to any disclaimer, the term of this patent is extended or adjusted under 35 U.S.C. 154(b) by 660 days.

(21) Appl. No.: 10/611,793

(22) Filed: Jun. 30, 2003

(65) Prior Publication Data

US 2004/0266372 A1   Dec. 30, 2004

(51) Int. Cl.
*H04B 1/04* (2006.01)
*H04B 1/18* (2006.01)

(52) U.S. Cl. .............................. 455/114.2; 455/114.3; 455/296

(58) Field of Classification Search .................. 455/91, 455/114.2, 115.1, 127.1, 222, 278.1, 283, 455/296, 310, 63.1, 67.13, 295, 114.3
See application file for complete search history.

(56) References Cited

U.S. PATENT DOCUMENTS

| | | | |
|---|---|---|---|
| 4,298,871 A | | 11/1981 | Kennedy et al. |
| 5,519,530 A | * | 5/1996 | Utsumi ....................... 359/264 |
| 5,646,631 A | | 7/1997 | Arntz |
| 6,104,761 A | | 8/2000 | McCallister |
| 6,236,864 B1 | | 5/2001 | McGowan |
| 6,356,606 B1 | * | 3/2002 | Hahm ........................ 375/350 |
| 6,366,619 B1 | | 4/2002 | McCallister |
| 6,519,244 B1 | * | 2/2003 | Unno ......................... 370/342 |
| 6,687,511 B2 | * | 2/2004 | McGowan et al. ......... 455/522 |
| 6,741,661 B2 | * | 5/2004 | Wheatley et al. ........... 375/296 |
| 6,845,082 B2 | * | 1/2005 | Bourget et al. ............. 370/210 |
| 2002/0191705 A1 | | 12/2002 | Melsa |
| 2003/0043895 A1 | | 3/2003 | Melsa |
| 2003/0053562 A1 | * | 3/2003 | Busson et al. .............. 375/322 |
| 2003/0063682 A1 | | 4/2003 | Shearer, III |
| 2003/0063683 A1 | | 4/2003 | Shearer |
| 2003/0086507 A1 | * | 5/2003 | Kim et al. ................... 375/297 |
| 2004/0008795 A1 | * | 1/2004 | Chu et al. ................... 375/260 |
| 2004/0100210 A1 | * | 5/2004 | Hori et al. .................. 315/307 |
| 2005/0163248 A1 | * | 7/2005 | Berangi et al. ............. 375/296 |

OTHER PUBLICATIONS

Buswell et al., Design of Low Cost, High Performance RF Front-ends for . . . , The Communications Edge.
Staudinger, Issues and Trends in Mobile Cellular Transmitter Power Amplification, Motorola.

* cited by examiner

*Primary Examiner*—Sonny Trinh
(74) *Attorney, Agent, or Firm*—Morgan & Finnegan LLP

(57) ABSTRACT

A communication and/or amplifier system according to various aspects of the present invention includes an excursion signal generator and a filter system. The excursion signal generator identifies a portion of a signal that exceeds a threshold, such as a magnitude threshold. The filter system filters a corresponding excursion signal having a magnitude and waveform corresponding to the portion exceeding the threshold to remove unwanted frequency components from the excursion signal. The filtered excursion signal may then be subtracted from the original signal to reduce the peak.

104 Claims, 12 Drawing Sheets

METHODS AND APPARATUS FOR CONTROLLING SIGNALS

FIELD OF THE INVENTION

The invention relates to methods and apparatus for communications and signal processing.

BACKGROUND OF THE INVENTION

Wireless communication base stations and other systems use power amplifiers, such as to transmit signals to cellular phones and other mobile devices. A power amplifier increases the average power of the transmitted wireless signal sufficiently to maintain a reliable communication link at any required distance. The transmitted signal's power varies randomly, depending on both the modulation type and the data sequence being transmitted, resulting in the signal exhibiting random peaks and troughs over time in its instantaneous power. The complexity and cost of an amplifier is highly dependent on the maximum instantaneous power that it must accommodate. Consequently, base station providers and other electronics users seek ways to lower the instantaneous or "peak"-power requirements of the relevant system.

To reduce system peak-power requirements, a provider may simply limit the maximum amplifier output power by constraining or "clipping" the maximum magnitude of its output signal. Clipping the amplifier output effectively reduces the peak-power output requirement while still providing ordinary amplification for non-peak signals. Since the cost of a power amplifier rapidly increases as it is required to accommodate higher peak-power levels, clipping can significantly reduce system cost.

This solution may be particularly attractive in applications in which occasional large peaks occur. For example, in wireless communications, a single amplifier often simultaneously amplifies signals for multiple channels. Occasionally, the multiple signals constructively combine to generate a relatively high peak. The amplifier must either fully amplify the peak, requiring an expensive high peak-power amplifier, or the output magnitude may be clipped to facilitate the use of a lower peak-power, less expensive amplifier.

In wireless communications, however, clipping is unacceptable. Clipping induces spectral regrowth, creating spectral energy in potentially restricted spectral regions. The electromagnetic spectrum is a finite resource, and it is strictly apportioned by restrictions from various regulation agencies to minimize interference from competing users. The various spectrum users receive permission to transmit within certain bandwidths and are ordinarily prohibited from transmitting outside of the designated bandwidth. Because spectral regrowth adds unacceptable frequency components to the signal, spectrum regulations do not permit clipping as a solution for high power amplifier requirements.

SUMMARY OF THE INVENTION

A communication and/or amplifier system according to various aspects of the present invention includes an excursion signal generator and a filter system. The excursion signal generator identifies a portion of a signal that exceeds a threshold, such as a magnitude threshold. The filter system filters a corresponding excursion signal having a magnitude and waveform corresponding to the portion exceeding the threshold to remove unwanted frequency components from the excursion signal. The filtered excursion signal may then be subtracted from the original signal to reduce the peak.

BRIEF DESCRIPTION OF THE DRAWING FIGURES

A more complete understanding of the present invention may be derived by referring to the detailed description when considered in connection with the following illustrative figures. In the following figures, like reference numbers refer to similar elements and steps.

Figure 7A:
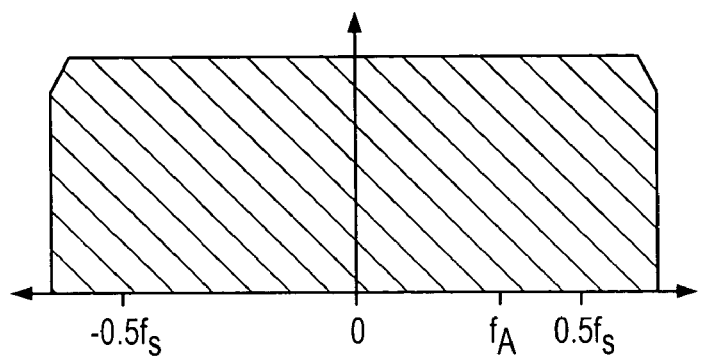
Figure 7B:
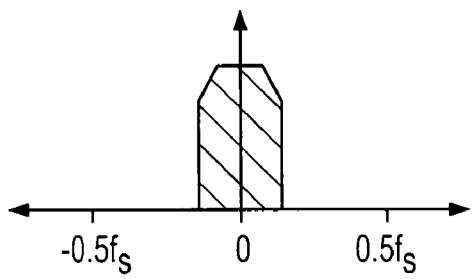
Figure 7C:
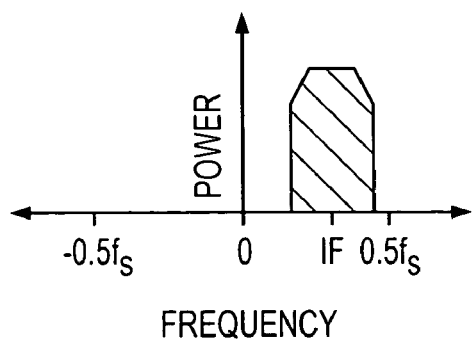
Figure 8:
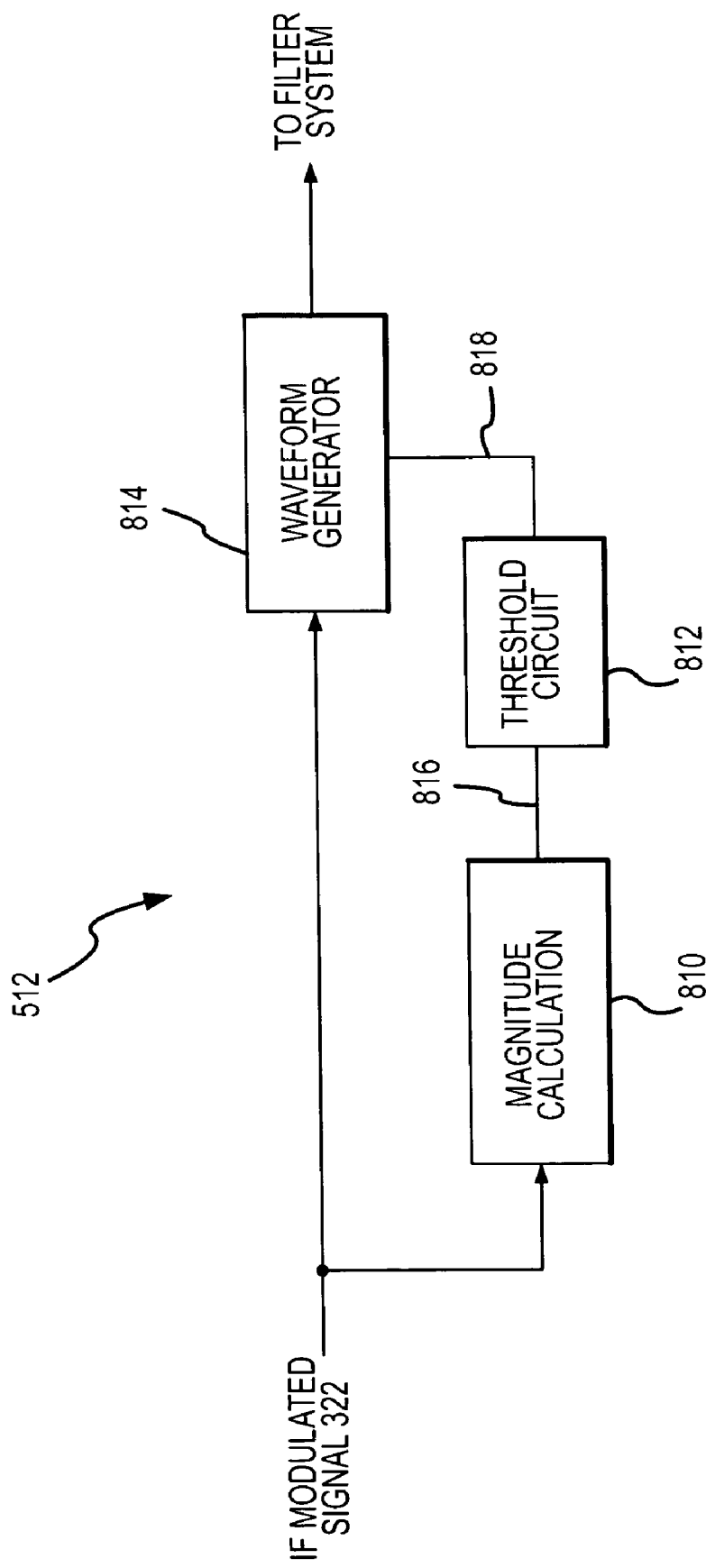
Figure 9:
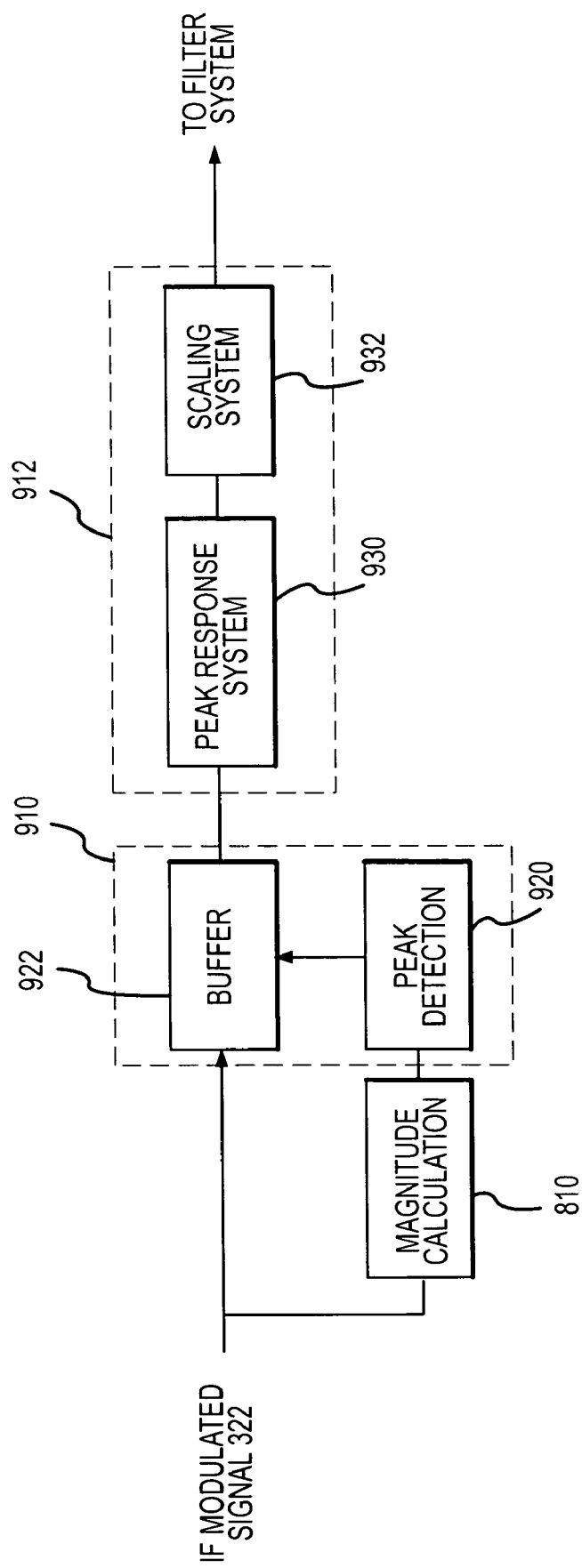
Figure 10:
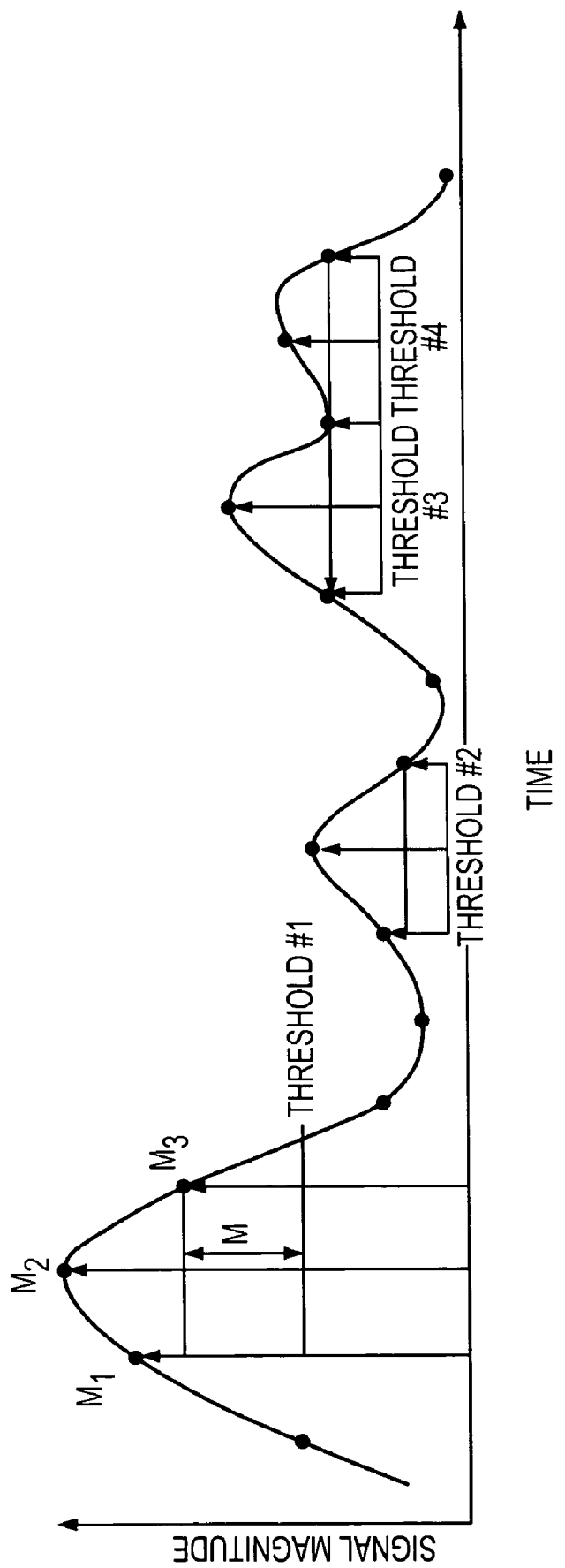
Figure 11B:
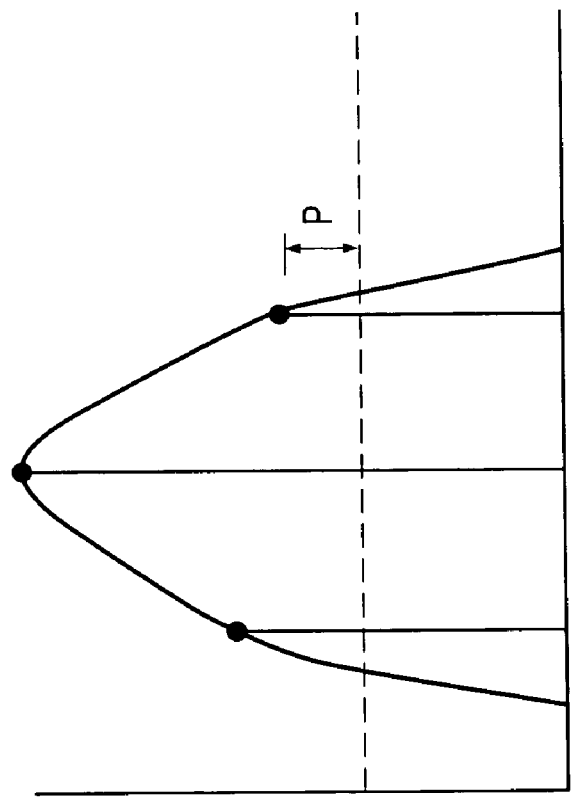
Figure 11A:
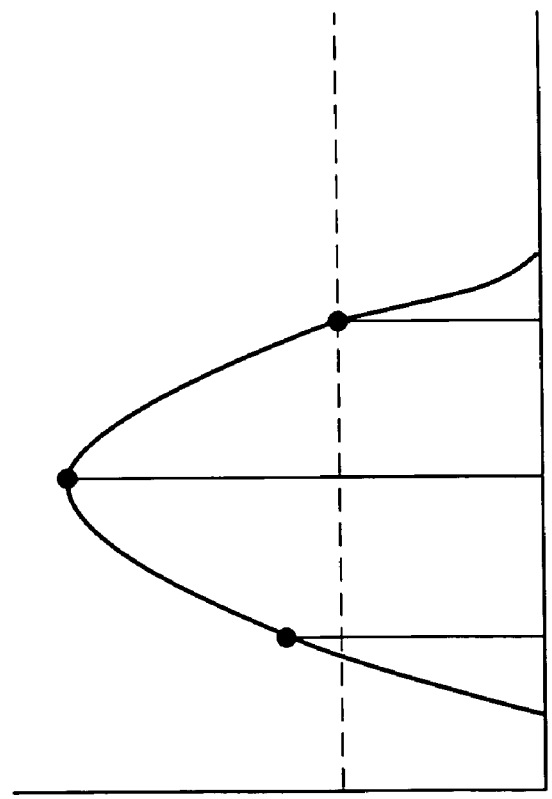

FIGS. 7A-C are frequency diagrams for a signal processed by a filter system;

FIG. 8 is a block diagram of an embodiment of an excursion signal generator;

FIG. 9 is a block diagram of an alternative embodiment of an excursion signal generator;

FIG. 10 is a waveform diagram of various magnitude peaks;

FIGS. 11A-B are waveform diagrams of waveform peaks; and

Figure 12:
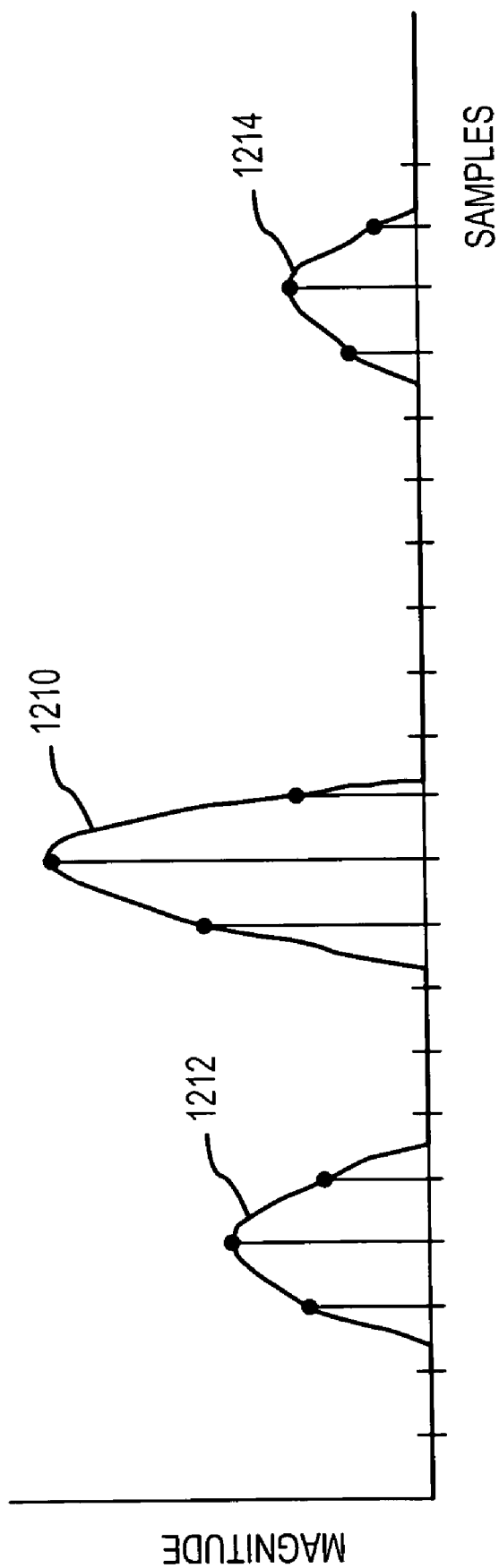

FIG. 12 is a waveform diagram of a sequence of waveform peaks.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention is described partly in terms of functional components and various processing steps. Such functional components may be realized by any number of components configured to perform the specified functions and achieve the various results. For example, the present invention may employ various elements, materials, signal sources, signal types, integrated components, amplifiers, filters, and the like, which may carry out a variety of functions. In addition, although the invention is described in the wireless communication environment, the present invention may be practiced in conjunction with any number of applications, environments, communication protocols, amplification systems, and signal processing systems, and the systems described are merely exemplary applications for the invention. Further, the present invention may employ any number of techniques for manufacturing, assembling, testing, and the like.

Figure 1:
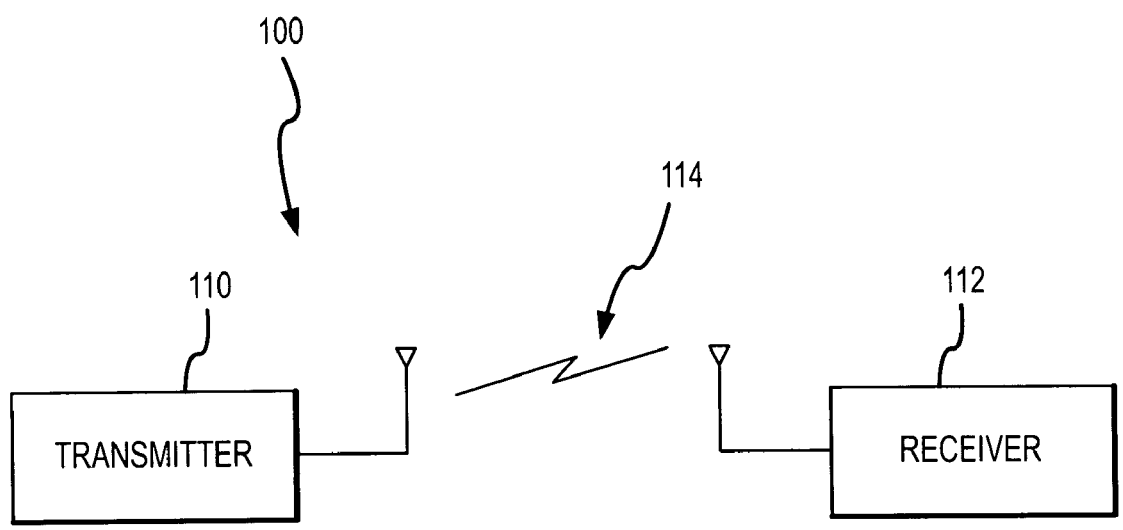
FIG. 1 is a block diagram of a communications system according to various aspects of the present invention.

Referring now to FIG. 1, a communications system 100 according to various aspects of the present invention comprises a transmitter 110 and a receiver 112. The transmitter 110 provides signals to the receiver 112 via a medium 114, such as optical signals, electrical signals, acoustic signals, or any other appropriate medium 114 for transferring signals between the transmitter 110 and the receiver 112. In the present embodiment, the transmitter 110 provides radio frequency signals to the receiver 112, such as wireless telephone signals.

The transmitter 110 and the receiver 112 are respectively configured to transmit and receive signals transmitted via the medium 114. The transmitter 110 and/or the receiver 112 may be configured as a transceiver to allow the reception and transmission of multiple signals from the same unit. In the present embodiment, the transmitter 110 is configured to modulate and transmit multiple signals to multiple receivers 112, such as a wireless communications base station, and the receivers 112 comprise remote mobile receivers, such as wireless telephones. The communications system 100 may be configured, however, in any suitable manner for communicating between any suitable transmitter 110 and receiver 112.

One embodiment of the transmitter 110 is configured to process a digital signal and transmit a corresponding signal to the receiver 112. The transmitter 110 may be configured in accordance with any appropriate specifications for wireless digital communication, such as in accordance with Global System for Mobile (GSM), time division multiple access (TDMA), and/or code division multiple access (CDMA) specifications. The transmitter 110 may be further configured in any suitable manner to receive digital information and transmit a corresponding analog signal to the receiver 112.

Figure 2:
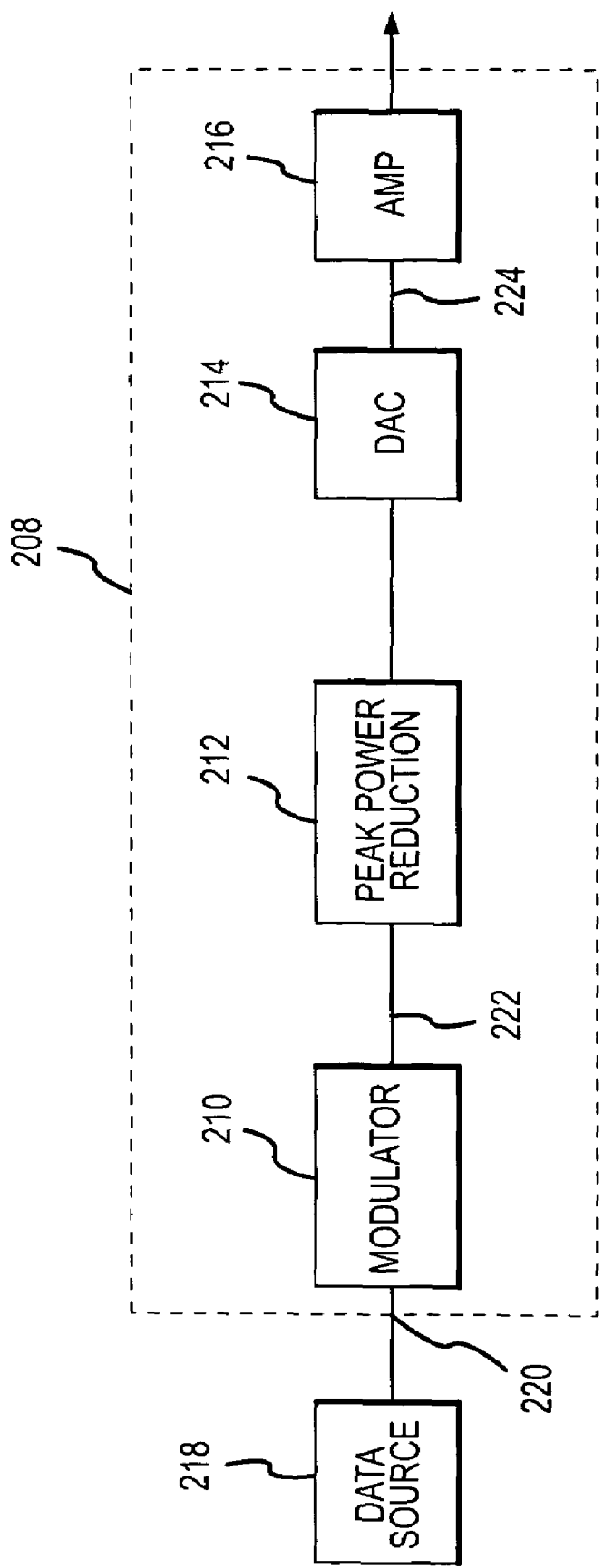
FIG. 2 is a block diagram of a signal processing system having a peak-power reduction component according to various aspects of the present invention.

For example, referring to FIG. 2, the transmitter 110 of the present embodiment includes a signal processing system 208 for processing a signal, such as for communication via the communication system 100. In the present embodiment, the signal processing system includes a modulator 210, a peak-power reduction component 212, a digital-to-analog converter (DAC) 214, and an amplifier 216. The modulator 210 receives digital information 220 from one or more data sources 218 and generates a modulated signal 222. The peak-power reduction component 212 is configured to receive the modulated signal 222 from the modulator 210 and substantially reduce the peak power output of the transmitter 110. The peak-power reduction component 212 may be additionally configured to inhibit spectral regrowth or other frequency components outside one or more desired bandwidths. In addition, the peak-power reduction component 212 may be further configured to inhibit or minimize the addition of noise to the signal to maintain an acceptable signal-to-noise ratio. The DAC 214 is configured to receive a digital signal from the peak-power reduction component 212 and convert the digital signal into an analog signal 224 for transmission. The amplifier 216 amplifies the analog signal 224 for transmission to the receiver 112.

Figure 3:
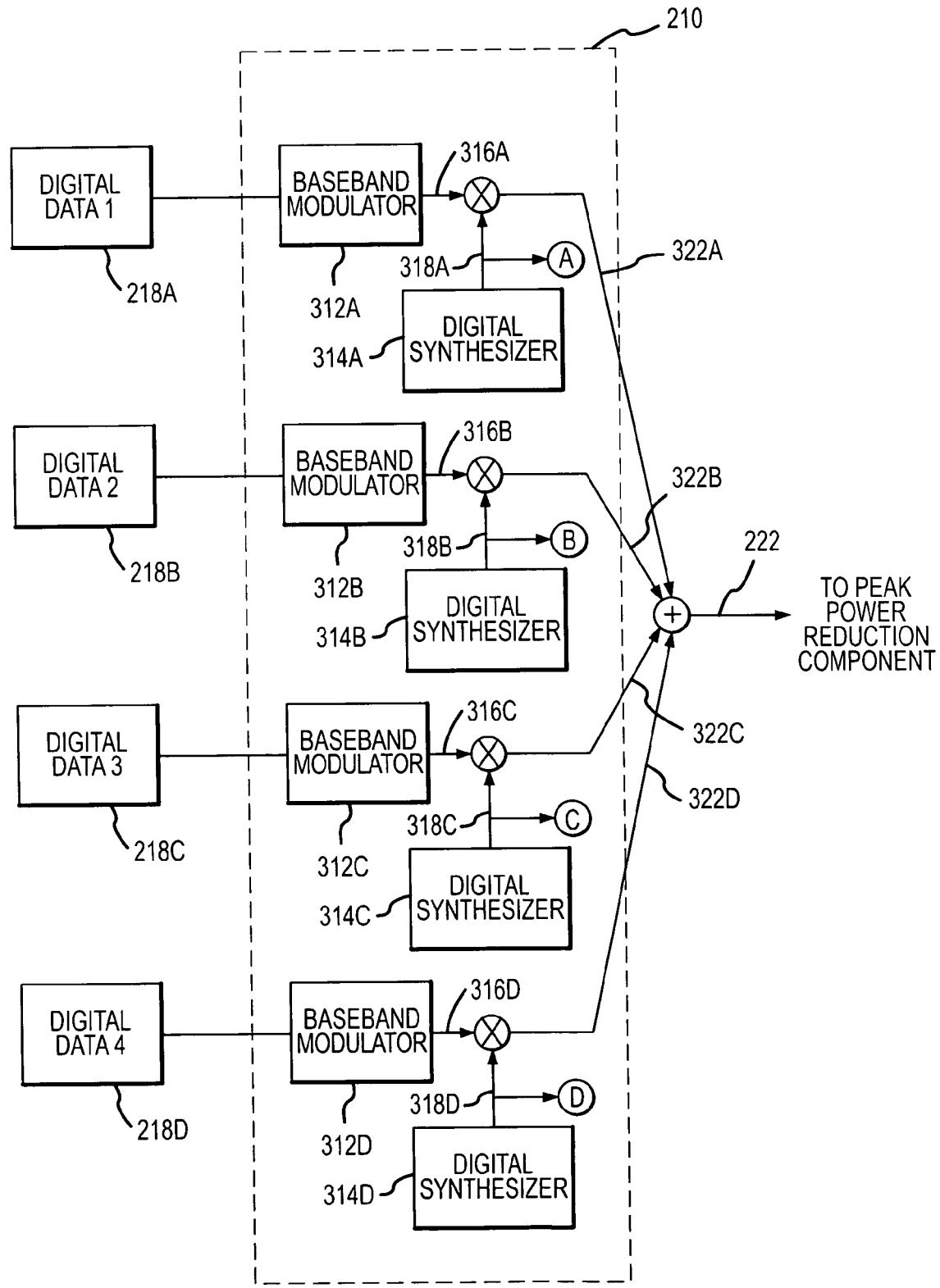
FIG. 3 is a block diagram of a modulator.

The modulator 210 may comprise any suitable system for modulating a digital signal. Referring to FIG. 3, an exemplary modulator 210 comprises a conventional digital modulator and generates an intermediate-frequency (IF) modulated signal 222. The modulator 210 suitably comprises a multi-channel modulator for receiving multiple channels of data, modulating the data for each channel with a different carrier frequency or other signal, and sums the various channel outputs into a composite output signal. The modulator 210 may be configured, however, in any suitable manner, for example as a single-channel modulator.

The present modulator 210 comprises one or more baseband modulators 312 and one or more digital synthesizers 314. Each baseband modulator 312A-D converts data into a baseband waveform according to an appropriate modulation, such that each baseband modulator 312A-D converts information bits, such as compressed binary digital data corresponding to voice, data, or video signals, into a corresponding baseband digital waveform 316A-D. The baseband digital waveforms 316A-D may comprise any suitable waveforms, such as waveforms in accordance with a selected transmission encoding specification, such as GSM, spread spectrum, TDMA, CDMA, or the like. In the present embodiment, the baseband digital waveforms 316A-D comprise time-varying sequences of complex pairs having an in-phase component (I) and a quadrature component (Q) occurring at a defined sample rate.

The digital synthesizer 314 generates a digital carrier frequency signal that is multiplied with the baseband digital waveform to generate the IF modulated signal 222. The digital synthesizer 314 may comprise any appropriate source of a digital carrier frequency or other signal to generate the individual IF modulated signals 322A-D. In the present embodiment, the digital synthesizer 314 comprises a conventional multiple output digital synthesizer configured to provide several different output signals 318A-D at different frequencies. The frequencies suitably correspond to center frequencies for accepted transmission frequencies for a particular cellular communication spectral mask. The present digital synthesizer 314 suitably generates complex exponential (cisoid) signals at the desired center frequencies for the individual IF modulated signals 322A-D for each channel. The digital synthesizer signal 318 is multiplied with the baseband digital waveform 316 for the relevant channel via a multiplier, thus translating each baseband waveform to the proper channel frequency for transmission to generate the individual IF modulated signals 322A-D. The various IF modulated signals 322A-D may be summed to form the composite IF modulated signal 222.

Figure 4:
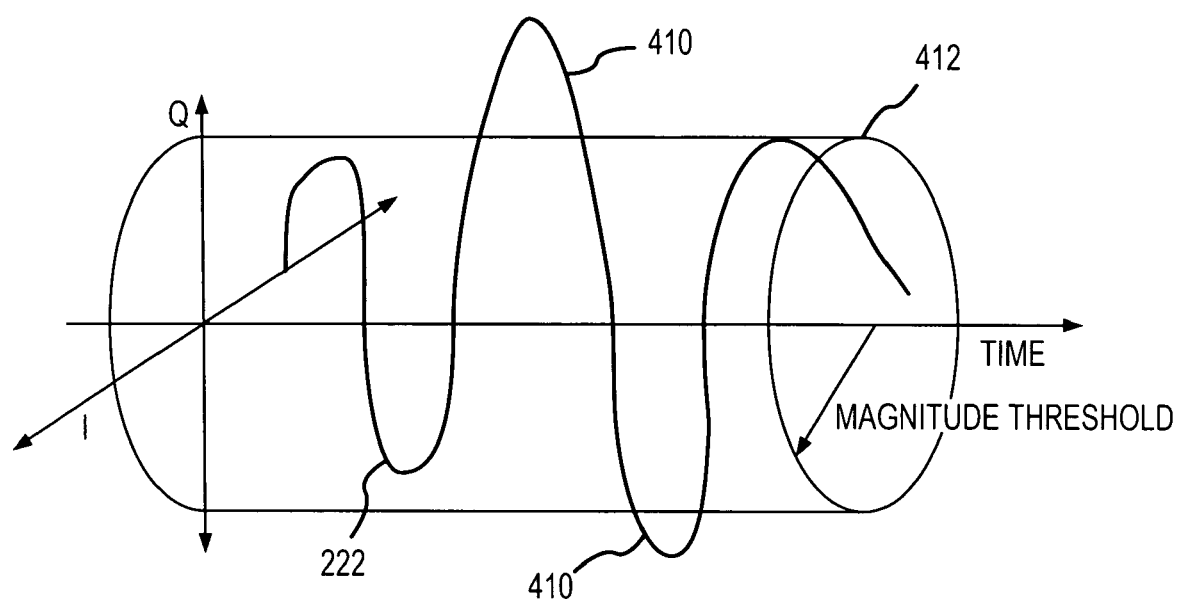
FIG. 4 is an illustration of a complex signal over time and a magnitude threshold.

The composite IF modulated signal 222 is provided to the peak-power reduction component 212. The peak-power reduction component 212 may be configured in any suitable manner to reduce the peak power output of the transmitter 110. The peak-power reduction component 212 may also inhibit transmission of unwanted spectral energy, for example frequency components outside a regulatory spectral mask. The peak-power reduction component 212 receives the IF modulated signal 222 from the modulator 210 and processes the IF modulated signal 222 according to any suitable process. For example, referring to FIG. 4, the peak-power reduction component 212 may be configured to generate an excursion signal in response to a peak portion 410 in the IF modulated signal 222 having a magnitude beyond a defined magnitude threshold 412. The peak-power reduction component 212 suitably removes or reduces the peak portion 410 from the IF modulated signal 222 in response to the excursion signal.

Figure 5:
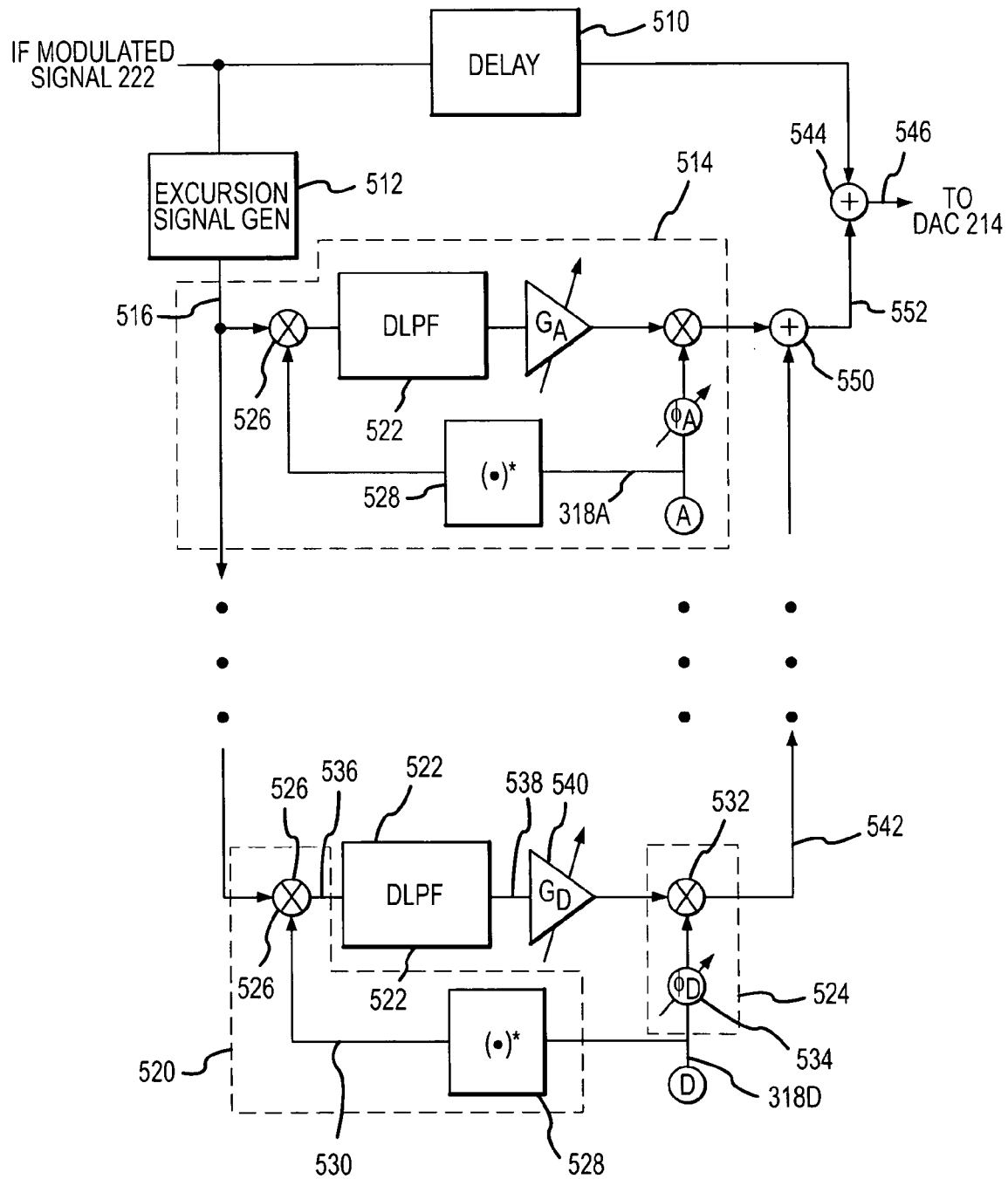
FIG. 5 is a block diagram of a peak-power reduction component.

Referring to FIG. 5, an exemplary embodiment of a peak-power reduction component 212 according to various aspects of the present invention comprises a delay element 510, an excursion signal generator 512, and a filter system 514. The excursion signal generator 512 generates an excursion signal 516 in response to the peak portions 410 in the IF modulated signal 222 exceeding the magnitude threshold 412. The filter system 514 filters unwanted frequencies from the signals processed by the excursion signal generator 512. An excursion reducer 544 subtracts the filtered excursion signal from the IF modulated signal. The delay element 510 compensates for propagation time delay through the excursion signal generator 512 and the filter system 514 so that the signal transmitted by the filter system 514 is time-synchronized with the IF modulated signal 222.

The excursion signal generator 512 may be configured in any suitable manner to generate an excursion signal responsive to peak portions of the IF modulated signal 222 or other relevant signal. The excursion signal may then be used in any suitable manner to reduce the peak power of the original signal. In one embodiment, the excursion signal generator 512 receives the IF modulated signal 222 and calculates magnitude values, such as successive magnitude values of the IF modulated signal 222 based on the successive signal complex pairs. The excursion signal generator 512 compares the magnitude of the signal 222 to the magnitude threshold 412. The excursion signal generator 512 generates an excursion signal 516 in response to the portions of the IF modulated signal 222 that exceed the magnitude threshold 412.

The excursion signal generator 512 may be implemented in any suitable manner to generate an excursion signal 516 that may be subtracted from or otherwise used to reduce one or more peaks in the original signal. In one embodiment, the excursion signal generator 512 is suitably configured to generate an excursion signal 516 that corresponds to the full duration of the IF modulated signal 222 that exceeds the magnitude threshold 412, though the excursion signal generator 512 may be configured to generate an excursion signal 516 that corresponds to a greater or lesser duration. For example, referring to FIG. 8, a first exemplary excursion signal generator 800 comprises a magnitude calculation circuit 810, a threshold circuit 812, and a waveform generator 814. The magnitude calculation circuit 810 calculates the magnitude of the IF modulated signal 222 and generates a corresponding magnitude signal 816. The magnitude calculation circuit 810 may be implemented in any suitable manner to determine the magnitude of the IF modulated signal 222, such as a conventional circuit configured to calculate the magnitude according to the following equation:

$$M(i) = \text{SQRT}(I^2(i) + Q^2(i))$$

where $M(i)$ is the magnitude of the IF modulated signal 222 for a complex sample pair $i$, $I(i)$ is the in-phase component of the signal for the complex sample pair $i$, and $Q(i)$ is the quadrature component of the signal for the complex sample pair $i$. The magnitude calculation may be performed, however, according to any suitable technique or algorithm.

The magnitude signal 816 is provided to the threshold circuit 812, which compares the calculated magnitude to the magnitude threshold 412 and generates a corresponding comparison signal 818. The threshold circuit 812 may comprise any suitable system for comparing the magnitude of the IF modulated signal 222 to the threshold. For example, the threshold circuit 812 may comprise a conventional comparator circuit or subtraction circuit.

The comparison signal 818 is provided to the waveform generator 814. The waveform generator 814 generates the excursion signal 516 according to the comparison signal 818. The waveform generator 814 may be configured in any suitable manner to generate the excursion signal 516, such as a conventional subtraction circuit to subtract the threshold value from the magnitude component of the IF modulated signal 222. If the comparison signal 818 indicates that the magnitude signal 816 does not exceed the threshold, the waveform generator 814 may generate a null signal. If the comparison signal 818 indicates that the magnitude signal 816 exceeds the threshold, the waveform generator 814 generates a signal having a magnitude corresponding to the difference between the magnitude of the IF modulated signal 222 and the magnitude threshold 412. The resulting excursion signal may then be filtered, scaled, and subtracted from the delayed IF modulated signal 222 to reduce signal peaks.

Figure 6:
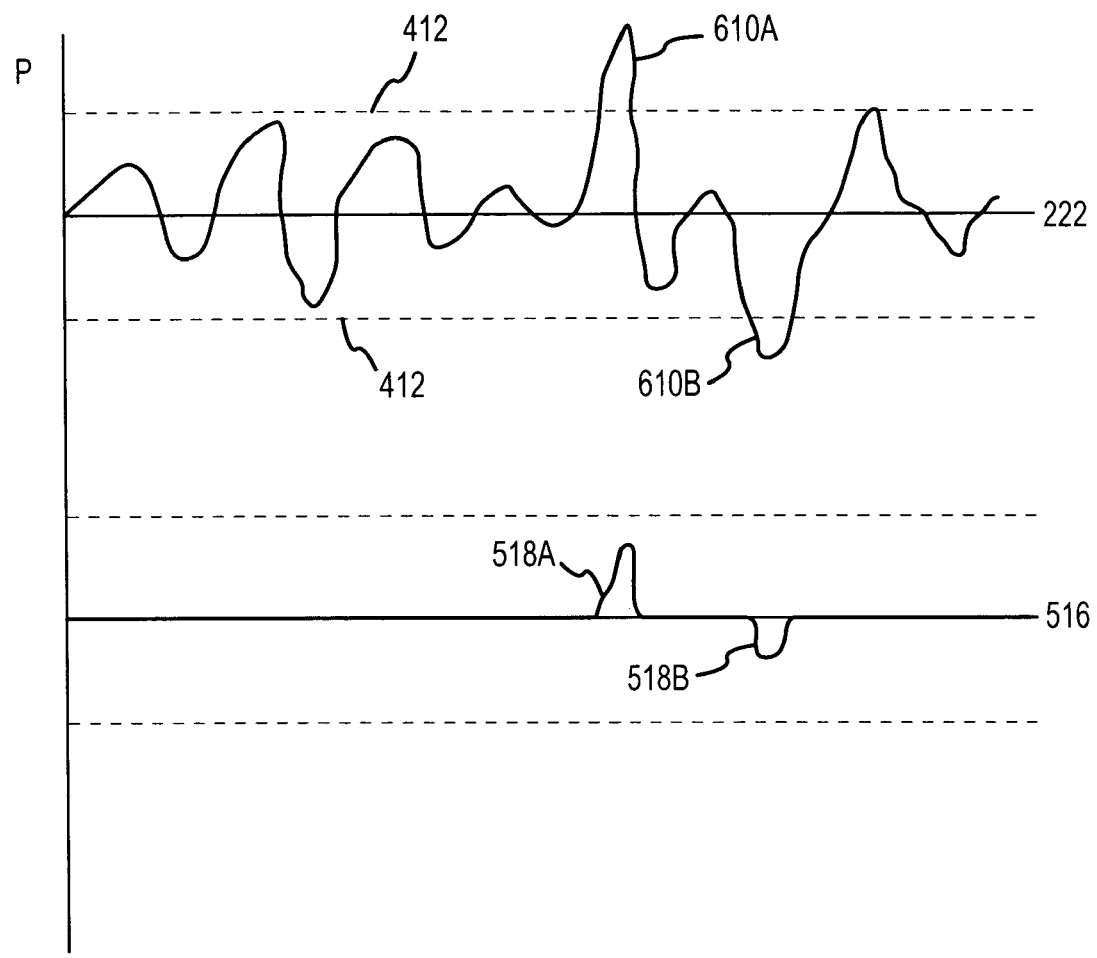
FIG. 6 is a signal diagram of an original signal and an excursion signal.

Thus, referring to FIG. 6, two portions 610A, B of an IF modulated signal 222 segment may exceed the magnitude threshold 412. In response, the excursion signal generator 512 generates a signal comprising two waveforms 518A, B having magnitudes corresponding to the difference between the magnitude of the IF modulated signal 222 and the magnitude threshold 412. The waveforms 518A, B suitably have durations that are substantially identical to the duration of the excursion portions 610A, B. The excursion signal generator 512 suitably generates a zero value excursion signal in response to portions of the IF modulated signal 222 having magnitudes below the magnitude threshold 412.

Alternatively, the excursion signal generator 512 may be configured to generate a signal corresponding to narrower portions of the IF modulated signal 222 that exceed the magnitude threshold. Responding to the peaks in the signal using a relatively narrow waveform, i.e. comprising relatively few complex pairs, may assist in minimizing noise added to the signal. For example, the excursion signal generator 512 may be configured to identify peaks in the IF modulated signal 222 and generate the excursion signal 51-6 in response to peaks exceeding the magnitude threshold 412, in which the responsive waveforms in the excursion signal 516 are narrower than the corresponding peaks in the IF modulated signal 222.

The excursion signal generator 512 may be configured in any suitable manner to generate an excursion signal 516 responsive to magnitude peaks in the incoming signal. For example, referring to FIG. 9, an alternative excursion signal generator 900 comprises a magnitude calculation circuit 810, a peak identification system 910, and a waveform generator 912. The peak identification system 910 identifies magnitude peaks in the incoming signal, and the waveform generator 912 generates the excursion waveform in response to the identified peaks.

The peak identification system 910 may be configured in any suitable manner to identify peaks in the incoming signal, such as via the magnitude signal from the magnitude calculation circuit 810. In the present embodiment, the peak identification system 910 comprises a peak detector 920 and a buffer 922. The peak detector 920 identifies a peak in the incoming signal in any suitable manner, such as by comparing the magnitudes of successive complex pairs in the incoming signal. For example, referring to FIG. 10, if a second magnitude $M_2$ in a sequence of three consecutive magnitudes is greater than a first magnitude $M_1$, and a third magnitude $M_3$ in the sequence is less than the second magnitude $M_2$, then the second magnitude represents a peak magnitude relative to the other magnitudes $M_1$, $M_3$.

The peak detector 920 provides a signal to the buffer 922 when a peak is detected in the incoming signal. The buffer 922 is suitably configured to temporarily store the incoming signal while the peak detector 920 identifies the peaks in the incoming signal. The buffer 922 may comprise any suitable storage element, such as a FIFO buffer having an appropriate number of storage elements. When a peak is detected, the buffer 922 suitably provides the relevant data to the waveform generator 912, such as the three complex pairs corresponding to the magnitudes $M_1$, $M_2$, $M_3$ defining the peak.

The waveform generator 912 may be configured in any suitable manner to generate a waveform in response to the peak identification system 910 signals. In the present embodiment, the waveform generator 912 comprises a peak response system 930 and a scaling system 932. The peak response system 930 is configured to generate an unscaled waveform in response to the detected peak in the incoming signal. The scaling system 932 is configured to adjust the magnitude of the waveform so that the resulting excursion signal reduces the peak in the IF modulated signal 222 to a selected threshold or below.

The peak response system 930 may be configured in any suitable manner to generate the excursion signal in response to the detected peak for reducing the magnitude of the peak. In the present embodiment, the peak response system 930 generates an unsealed excursion signal according to a selected portion, such as three complex pairs, corresponding to the identified peak. The unscaled excursion signal may comprise, however, any suitable number of complex samples corresponding to the peak. For example, the unsealed excursion signal may comprise multiple complex pairs $M_1$, $M_2$, $M_3$ identical to the complex pairs corresponding to the detected peak $M_1$, $M_2$, $M_3$. The unsealed excursion signal may also be adjusted, for example by changing the magnitude of each complex pair according to any suitable criteria, such as increasing or decreasing the magnitude by a selected amount or by a factor.

The scaling system 932 receives the unsealed excursion signal from the peak response system 930 and selectively adjusts the magnitude of the signal to generate the final excursion signal. The scaling system 932 may scale the excursion signal according to any suitable process and may be implemented in any suitable manner. For example, the scaling system 932 may be configured to selectively adjust the unsealed excursion signal such that the controlled magnitude signal 546 does not exceed the selected threshold. For example, if the threshold for a particular system is 1.8 and the magnitude of the IF modulated signal 222 is 4.0, the scaling system 932 is suitably configured to scale the magnitude of the filtered excursion signal to 2.2.

The scaling system 932 may be implemented in any suitable manner to adjust the magnitude of the excursion signal, such as to accommodate different thresholds for different applications or environments. For example, the scaling system 932 may comprise a memory element, such as a read-only memory, containing a lookup table having multiple inputs. One input suitably comprises the threshold for the particular application or environment. Another input comprises a signal relating to the IF modulated signal 222, such as the magnitude of the peak $M_2$. The lookup table may then output a predetermined scaling factor for adjusting the magnitude of a peak having the particular magnitude $M_2$ to arrive at the desired threshold, which may then be multiplied with the unscaled excursion signal to control the magnitude of the signal.

The scaling system 932 may also be configured to adjust the scaling applied to a peak according to the proximity of the peak to another peak and/or the relative magnitudes of the peaks. For example, in a digital communication environment, two peaks may be related such that a main peak in the signal may induce one or more secondary, lower magnitude peaks. The secondary peaks typically occur within a defined interval with respect to the main peak. Accordingly, the secondary peaks may be identified and subjected to a reduced scaling.

For example, referring to FIG. 12, a main peak 1210 in a signal may be preceded by a preceding peak 1212 and followed by a following peak 1214. The scaling system 932 is suitably configured to selectively adjust the scaling for the preceding peak 1212 and/or the following peak 1214 according to appropriate criteria, such as whether the preceding peak 1212 or following peak 1214 occurs within a particular interval or the relative magnitude of the main peak 1210 and the preceding peak 1212 or the following peak 1214.

In the present embodiment, the scaling system 932 is configured to determine whether the preceding and following peaks 1212, 1214 are within a particular interval, such as five to seven samples or other suitable interval. In the present example, because the middle sample of the preceding peak 1212 is six samples before the middle sample of the main peak 1210, then the preceding peak is a candidate for adjusted scaling. The middle sample of the following peak 1214 is more than seven samples from the middle sample of the main peak 1210, so the following peak 1214 is not a candidate for adjusted scaling and is suitably scaled like any other peak in the signal.

Candidates for adjusted scaling may be analyzed and scaled (or not scaled at all) according to any suitable criteria. For example, candidates for adjusted scaling may be analyzed for appropriate scaling based on the relative magnitudes of the main peak and the candidate peak. For example, if the candidate peak magnitude is greater than a percentage of the main peak magnitude, such as 50%, then the candidate peak may be subjected to ordinary scaling. If the candidate peak magnitude is at or below the threshold, then the amount of scaling may be decreased by a selected amount, changed to a negative scaling (i.e., increasing the magnitude of the peak), or eliminating the scaling altogether.

The excursion signal generator 512 may also be configured to provide any other additional processing that may be desired. For example, the excursion signal generator 512 may be configured to process the excursion signal to promote time- and phase-alignment of the filtered excursion signal with the IF modulated signal. Referring to FIGS. 11A-B, in the present embodiment, the excursion signal generator 512 is configured to add a pedestal P (FIG. 11B) of additional magnitude to an original excursion signal (FIG. 11A). The magnitude of the pedestal may be selected or calculated to achieve an optimal compromise between peak-reduction and the in-band noise added by the peak-reduction processing itself.

The pedestal may comprise a constant value to be added, or may be calculated according to any appropriate criteria, such as according to the maximum amplitude of the excursion signal. In one embodiment, the size of the pedestal is selected by calculating a fraction of the difference between the maximum magnitude and the minimum magnitude of the three complex pairs. For example, the pedestal P may be calculated as one-quarter of the difference between the minimum and maximum amplitudes.

The excursion signal 516 is provided to the filter system 514 to eliminate unacceptable spectral energy, such as frequency components induced by the excursion signal generator 512. The frequencies to be filtered may be selected according to any suitable criteria. In the present embodiment, spectral energy is eliminated at any frequencies other than those approved by the applicable regulatory spectral mask. The filter system 514 may be configured in any suitable manner to substantially filter the unwanted frequencies and transmit the desired frequencies. For example, the filter system 514 is suitably configured to separate the excursion signal 516 into individual frequency components according to the input channels. The filter system 514 filters individual components of the IF modulated signal 222 to eliminate the unwanted frequencies. Alternatively, the filter system 514 may be configured as a bandpass filter to pass the selected frequencies and stop unwanted frequencies, or otherwise configured to remove unwanted frequency components. In addition, the filter system 514 may comprise multiple filter systems, such as a cascade of filter systems.

In the present embodiment, the filter system 514 comprises multiple stages for the various channels. Each stage suitably comprises a conventional digital filter for removing selected frequencies from the excursion signal for the particular channel. For example, each stage may include a down converter 520, a low pass filter 522, and an up converter 524, and each channel suitably operates in a similar manner. Referring to FIGS. 5 and 7A-C, the down converter 520 receives the excursion signal 516, which exhibits a wide range of frequencies (FIG. 7A). The down converter 520 shifts the frequency of the entire input spectrum to the left, such as by an amount substantially corresponding to the center frequency of the relevant channel. The low pass filter 522 filters input signals to substantially stop signals above a selected cutoff frequency $F_C$ and substantially transmit signals below the selected cutoff frequency (FIG. 7B). The up converter 524 adjusts the frequency of the input signal to a higher frequency, such as to a selected frequency or by a selected amount. In the present embodiment, the up converter 524 shifts the center frequency by an amount substantially corresponding to the center frequency of the relevant channel, i.e. back to the original intermediate frequency IF (FIG. 7C). The various filtered signals are then combined into a composite signal by a filtered signal summer 550.

An exemplary down converter 520 for the present embodiment comprises a multiplier 526 and a complex conjugate generator 528. The complex conjugate generator 528 receives the relevant digital synthesizer signal 318 from the relevant digital synthesizer 314 and generates a complex conjugate signal 530 corresponding to the complex conjugate of the digital synthesizer signal 318. The multiplier 526 multiplies the complex conjugate signal 530 with the excursion signal 516. The resulting down-adjusted signal 536 is a substantially identical waveform as the excursion signal 516, but circularly shifted to the left (reduced in frequency) by an amount substantially equal to the channel center frequency.

The down-adjusted signal 536 is provided to the low-pass filter 522. The low-pass filter 522 may be implemented in any suitable manner and may be configured to use any suitable cutoff frequency. For example, the low-pass filter may comprise a single filter, multiple parallel filters, or a cascade of filters. In the present embodiment, the low-pass filter 522 comprises a digital low-pass filter, such as an infinite impulse response filter, having a cutoff frequency corresponding to one-half the bandwidth of the relevant approved frequency bandwidth. For example, if the approved frequency range is 20 MHz to 20.5 MHz, the cutoff frequency may be set at one-half of the 500 kHz bandwidth, or at 250 kHz. The low pass filter 522 thus transmits a filtered signal 538 comprising the components of the down-adjusted signal 536 that are below the cutoff frequency and filters out any components above the cutoff frequency. The low pass filter 522 suitably comprises an approximately linear phase filter to minimize the amount of phase and/or magnitude error induced by the filter.

The filtered signal 538 is transmitted to the up converter 524 for conversion back to the original center frequency IF. In the present embodiment, the up converter 524 comprises a multiplier 532. The multiplier 532 multiplies the filtered signal 538 with the digital synthesizer signal 318 from the digital synthesizer 314 to return the filtered signal 538 to the original center frequency IF.

The signal processing system may also be configured to adjust the magnitude and/or phase of the filtered signal 538. Because the filtered signal is to be subtracted from the IF modulated signal 222, the filtered signal is suitably configured to exactly match the portion of the IF modulated signal 222 that exceeds the threshold 412. The processing of the filtered signal 538, however, may alter its magnitude and phase relative to the IF modulated signal 222. Consequently, the signal processing system may be configured to adjust the filtered signal 538 to compensate for the magnitude and/or phase changes.

For example, in the present embodiment, the low pass filter 522 suitably comprises an equalized low pass filter to compensate for frequency-dependent changes in the filtered signal 538 propagation delay. In the present embodiment, each individual filter stage for a particular channel includes a dedicated phase correction element 534 to compensate for different phase errors associated with each individual filter stage, such as phase errors introduced by frequency conversion operations and the propagation delay through each filter. The phase adjuster 534 suitably adjusts the phase of the filtered signal 538 according to the radian frequency of the digital synthesizer signal 318 from the digital synthesizer 314 multiplied by the duration of the propagation delay through the filter system 514.

The resulting phase-adjusted filtered signal 542 comprises a waveform corresponding to the excursion of the IF modulated signal 222 beyond the threshold magnitude. Due to the filtering, the phase-adjusted filtered signal 542 includes few or no components having frequencies outside the approved bandwidth, such as components that may be generated via spectral regrowth or generation of noise.

The filtered signal 538 may also be further processed according to any desired criteria. For example, the filtered signal 538 may be provided to a channel scaling circuit 540, for example between the filter 522 and the up converter 524. The channel scaling circuit 540 may adjust the relative signal energy for the multiple signals to control the amount of in-band noise added to the overall signal. The channel scaling circuit 540 is suitably responsive to base station control signals that adjust the transmission power for a particular channel, such as according to the estimated attenuation between the transmitter 110 and the receiver 112.

The composite phase-adjusted filtered signal 552 is provided to the excursion reducer 544. The excursion reducer 544 also receives the IF modulated signal 222 via the delay element 510. The delay element 510 is configured to compensate for the propagation time of the signal through the excursion signal generator 512, frequency adjusters 520, 524, filter 522, and/or other components. The excursion reducer 544 combines the IF modulated signal 222 and the phase-adjusted filtered signal 542, for example, by subtracting the phase-adjusted filtered signal 542 from the IF modulated signal 222. The excursion reducer 544 generates a controlled magnitude signal 546 having a magnitude within the threshold 412 and with few or no components outside the approved bandwidth. The controlled magnitude signal 546 is provided to the DAC 214, which converts the controlled magnitude signal 546 into an analog signal 224 for amplification and transmission.

In operation, the communications system 100 provides for communications while substantially reducing the peak-power of the signal. The communications system 100 also suitably inhibits transmission of frequencies outside of approved bandwidths. In particular, the modulator 210 generates the IF modulated signal 222 according to digital data received from the data source 218. The IF modulated signal 222 is provided to the delay element 510 and the excursion signal generator 512. The excursion signal generator 512 identifies portions of the IF modulated signal 222 beyond the desired threshold and generates a corresponding excursion signal 516. The excursion signal comprises any suitable signal for reducing the peak in the IF modulated signal 222.

The excursion signal 516 is provided to the filter system 514 to remove any components in the excursion signal 516 outside of the approved bandwidths. In particular, the excursion signal 516 is provided to the down converter 520, which changes the center frequency of the signal from the intermediate frequency to a lower frequency, such as baseband. The down-adjusted signal is then provided to the low-pass filter 522, which filters out frequencies above the cutoff frequency. In the present embodiment, the cutoff frequency corresponds to one half the bandwidth of the approved bandwidth. The filtered signal 538 is then adjusted by the up converter 524 to return the signal's center frequency to the intermediate frequency. The filtered signal may also be processed for phase and magnitude adjustment to compensate for changes induced by the excursion signal generator 512 and the filter system 514.

The composite filtered signal 552 comprises a waveform corresponding to the waveform of the excursion beyond the threshold in the IF modulated signal 222. By filtering the excursion signal, unwanted frequency components, such as those attributable to spectral regrowth, may be eliminated from the composite filtered signal 552. When this composite filtered signal 552 is subtracted from the delayed IF modulated signal 222 by the excursion reducer, the resulting controlled magnitude signal 546 tends to remain within the threshold and exhibits few or no unwanted frequency components introduced by the peak-power reduction component 212. Consequently, the peak-power of the signal decreases, facilitating use of a lower cost amplifier 216.

In addition, the peak-power reduction component 212 need not precisely determine the instant at which an excursion peak occurs, or the amplitude or phase of the peak. Instead, the entire excursion waveform or a narrow peak portion of the waveform is filtered and subtracted from the IF modulated signal 222 with corrections for delays and equalization. Further, the peak-power reduction component suitably operates in the same manner, regardless of the number of input signals.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

The present invention has been described above with reference to a preferred embodiment. However, changes and modifications may be made to the preferred embodiment without departing from the scope of the present invention. These and other changes or modifications are intended to be included within the scope of the present invention.

The invention claimed is:

1. A communication system, comprising:
a transmitter, comprising:
an excursion signal generator configured to identify an excursion event in a first signal exceeding a threshold and generate an excursion signal corresponding to the excursion event, wherein the excursion event is comprised of a plurality of signal samples having magnitudes which exceed the threshold;
a scaling system configured to adjust the magnitude of the excursion signal;
a filter system configured to filter the excursion signal;
a delay element configured to time align the excursion signal with the first signal;
an excursion reducer responsive to the excursion signal generator and configured to subtract the excursion signal from the first signal, wherein the excursion signal subtracted from the first signal is comprised of a plurality of signal samples having magnitudes which exceed the threshold; and
a receiver configured to receive the first signal.

2. The communication system according to claim 1, wherein the filter system is configured to filter frequencies outside of a regulatory spectral mask.

3. The communication system according to claim 1, wherein the filter system comprises more than one stage, and wherein each stage is configured to filter a channel of the first signal.

4. The communication system according to claim 3, wherein at least one stage includes a phase correction element configured to compensate for phase changes in the first signal.

5. The communication system according to claim 1, wherein the first signal is a wireless communication signal.

6. The communication system according to claim 1, wherein the first signal is a composite signal comprising a plurality of individual signals.

7. The communication system according to claim 1, wherein the excursion reducer is configured to subtract the excursion signal from the first signal without estimating at least one of a time, a magnitude, or a phase of a signal peak.

8. The communication system according to claim 1, wherein the excursion signal generator is configured to calculate a magnitude of the first signal, compare the magnitude to the threshold, and generate an excursion signal.

9. The communication system according to claim 8, wherein the excursion signal generator is further configured to add a pedestal to the excursion signal.

10. The communication system according to claim 9, wherein a magnitude of the pedestal is calculated according to at least two samples in the excursion.

11. The communication system according to claim 8, wherein the excursion signal corresponds to a difference between a magnitude of the first signal and the threshold if the magnitude of the first signal exceeds the threshold.

12. The communication system according to claim 8, wherein the excursion signal has a duration that is substantially identical to a duration of the excursion.

13. The communication system according to claim 1, wherein the excursion signal generator comprises:
a peak identification system configured to identify a peak in the first signal; and
a waveform generator responsive to the peak identification system and configured to generate the excursion signal according to at least one of the magnitude and the occurrence of the peak.

14. The communication system according to claim 13, wherein the peak comprises a set of three consecutive samples, wherein the middle sample has a higher magnitude than the first and third samples.

15. The communication system according to claim 13, wherein the waveform generator comprises:

a peak response system configured to generate the excursion signal.

16. The communication system according to claim 15, wherein the scaling system comprises a storage system storing a lookup table.

17. The communication system according to claim 15, wherein the scaling system is configured to adjust the magnitude of the excursion signal according to the threshold, and wherein the threshold comprises a selected threshold from a plurality of thresholds.

18. The communication system according to claim 15, wherein the scaling system is configured to adjust the magnitude of the excursion signal according to the magnitude of a proximate peak to the peak.

19. The communication system according to claim 18, wherein the proximate peak is defined according to a selected range of samples from the peak.

20. The communication system according to claim 18, wherein the scaling system is configured to adjust the magnitude of the excursion signal according to the relative magnitudes of the proximate peak and the peak.

21. The communication system according to claim 1, wherein the transmitter further comprises a phase compensation system configured to compensate for phase changes in the first signal.

22. A signal processing system, comprising:
an excursion signal generator configured to identify an excursion event in a main signal and generate an excursion signal corresponding to the excursion event, wherein the excursion event is comprised of a plurality of signal samples having magnitudes outside a defined parameter of the main signal:
a scaling system configured to adjust the magnitude of the excursion signal;
a filter system configured to filter the excursion signal;
a delay element configured to time align the excursion signal with the main signal: and
an excursion reducer configured to subtract the excursion from the main signal, wherein the excursion signal subtracted from the main signal is comprised of a plurality of signal samples outside the defined parameter of the main signal.

23. The signal processing system according to claim 22 wherein the filter system is configured to filter frequencies outside of a regulatory spectral mask.

24. The signal processing system according to claim 22 wherein the filter system comprises more than one stage, and wherein each stage is configured to filter a channel of the main signal.

25. The signal processing system according to claim 24, wherein at least one stage includes a phase correction element configured to compensate for phase changes in the main signal.

26. The signal processing system according to claim 22, wherein the main signal is a wireless communication signal.

27. The signal processing system according to claim 22, wherein the main signal is a composite signal comprising a plurality of individual signals.

28. The signal processing system according to claim 22, wherein the excursion reducer is configured to subtract the excursion signal from the main signal without estimating an occurrence of a signal peak.

29. The signal processing system according to claim 22, wherein the excursion signal generator is configured to calculate a magnitude of the main signal, compare the magnitude to a threshold, and generate an excursion signal.

30. The signal processing system according to claim 29, wherein the excursion signal generator is further configured to add a pedestal to the excursion signal.

31. The signal processing system according to claim 30, wherein a magnitude of the pedestal is calculated according to at least two samples in the excursion.

32. The signal processing system according to claim 29, wherein the excursion signal corresponds to a difference between a magnitude of the main signal and the threshold if the magnitude of the main signal exceeds the threshold.

33. The signal processing system according to claim 29, wherein the excursion signal has a duration that is substantially identical to a duration of the excursion.

34. The signal processing system according to claim 22, wherein the excursion signal generator comprises:
a peak identification system configured to identify a peak in the main first signal; and
a waveform generator responsive to the peak identification system and configured to generate the excursion signal according to at least one of the magnitude and the occurrence of the peak.

35. The signal processing system according to claim 34, wherein the peak comprises a set of three consecutive samples, wherein the middle sample has a higher magnitude than the first and third samples.

36. The signal processing system according to claim 34, wherein the waveform generator comprises:
a peak response system configured to generate the excursion signal.

37. The signal processing system according to claim 36, wherein the scaling system comprises a storage system storing a lookup table.

38. The signal processing system according to claim 36, wherein the scaling system is configured to adjust the magnitude of the excursion signal according to the defined parameter of the main signal, and wherein the defined parameter comprises a selected parameter from a plurality of parameters.

39. The signal processing system according to claim 36, wherein the scaling system is configured to adjust the magnitude of the excursion signal according to the magnitude of a proximate peak to the peak.

40. The signal processing system according to claim 39, wherein the proximate peak is defined according to a selected range of samples from the peak.

41. The signal processing system according to claim 39, wherein the scaling system is configured to adjust the magnitude of the excursion signal according to the relative magnitudes of the proximate peak and the peak.

42. The signal processing system according to claim 22, wherein the transmitter further comprises a phase compensation system configured to compensate for phase changes in the main signal.

43. A transmitter system comprising:
an excursion signal generator configured to identify an excursion event in a main signal and generate an excursion signal corresponding to the excursion event, wherein the excursion event is comprised of a plurality of signal samples having magnitudes outside a defined parameter of the main signal:
a scaling system configured to adjust the magnitude of the excursion signal;
a filter system configured to filter the excursion signal;
a delay element configured to time align the excursion signal with the main signal;
an excursion reducer configured to subtract the excursion from the main signal, wherein the excursion subtracted from the main signal is comprised of a plurality of signal samples outside the defined parameter of the main signal; and an amplifier configured to amplify the main signal.

44. The transmitter system according to claim 43, wherein the filter system is configured to filter frequencies outside of a regulatory spectral mask.

45. The transmitter system according to claim 43, wherein the filter system comprises more than one stage, and wherein each stage is configured to filter a channel of the main signal.

46. The transmitter system according to claim 45, wherein at least one stage includes a phase correction element configured to compensate for phase changes in the main signal.

47. The transmitter system according to claim 43, wherein the main signal is a wireless communication signal.

48. The transmitter system according to claim 43, wherein the main signal is a composite signal comprising a plurality of individual signals.

49. The transmitter system according to claim 43, wherein the excursion reducer is configured to subtract the excursion signal from the main signal without estimating an occurrence of a signal peak.

50. The transmitter system according to claim 43, wherein the excursion signal generator is configured to calculate a magnitude of the main signal, compare the magnitude to a threshold, and generate an excursion signal.

51. The transmitter system according to claim 50, wherein the excursion signal generator is further configured to add a pedestal to the excursion signal.

52. The transmitter system according to claim 51, wherein a magnitude of the pedestal is calculated according to at least two samples in the excursion.

53. The transmitter system according to claim 50, wherein the excursion signal corresponds to a difference between a magnitude of the main signal and the threshold if the magnitude of the main signal exceeds the threshold.

54. The transmitter system according to claim 50, wherein the excursion signal has a duration that is substantially identical to a duration of the excursion.

55. The transmitter system according to claim 43, wherein the excursion signal generator comprises:

a peak identification system configured to identify a peak in the main signal; and a waveform generator responsive to the peak identification system and configured to generate the excursion signal according to at least one of the magnitude and the occurrence of the peak.

56. The transmitter system according to claim 55, wherein the peak comprises a set of three consecutive samples, wherein the middle sample has a higher magnitude than the first and third samples.

57. The transmitter system according to claim 55, wherein the waveform generator comprises:

a peak response system configured to generate the excursion signal.

58. The transmitter system according to claim 57, wherein the scaling system comprises a storage system storing a lookup table.

59. The transmitter system according to claim 57, wherein the scaling system is configured to adjust the magnitude of the excursion signal according to the defined parameter of the main signal, and wherein the defined parameter comprises a selected parameter from a plurality of parameters.

60. The transmitter system according to claim 57, wherein the scaling system is configured to adjust the magnitude of the excursion signal according to the magnitude of a proximate peak to the peak.

61. The transmitter system according to claim 60, wherein the proximate peak is defined according to a selected range of samples from the peak.

62. The transmitter system according to claim 60, wherein the scaling system is configured to adjust the magnitude of the excursion signal according to the relative magnitudes of the proximate peak and the peak.

63. The transmitter system according to claim 43, wherein the transmitter further comprises a phase compensation system configured to compensate for phase changes in the main signal.

64. A method for processing signals, comprising:

identifying an excursion event in a main signal and generating an excursion signal corresponding to the excursion event, wherein the excursion event is comprised of a plurality of signal samples having magnitudes outside a defined parameter of the main signal;

adjusting the magnitude of the excursion signal;

filtering the excursion signal;

time aligning the excursion signal with the main signal;

subtracting the excursion signal from the main signal, wherein the excursion signal subtracted from the main signal is comprised of a plurality of signal samples outside the defined parameter of the main signal.

65. The method according to claim 64, wherein filtering the excursion signal comprises filtering frequencies outside of a spectral mask.

66. The method according to claim 64, further comprising compensating for phase changes in the main signal.

67. The method according to claim 64, wherein the main signal is a wireless communication signal.

68. The method according to claim 64, wherein the main signal is a composite signal comprising a plurality of individual signals.

69. The method according to claim 64, wherein subtracting the excursion from the main signal includes subtracting the excursion from the main signal without estimating an occurrence of a signal peak.

70. The method according to claim 64, wherein identifying the excursion includes:

calculating a magnitude of the main signal;

comparing the magnitude to a threshold; and generating an excursion signal according to the comparison of the magnitude to the threshold.

71. The method according to claim 70, wherein identifying the excursion further includes adding a pedestal to the excursion signal.

72. The method according to claim 71, wherein a magnitude of the pedestal is calculated according to at least two samples in the excursion.

73. The method according to claim 70, wherein the excursion signal corresponds to a difference between the magnitude of the main signal and the threshold if the magnitude of the main signal exceeds the threshold.

74. The method according to claim 70, wherein the excursion signal has a duration that is substantially identical to a duration of an excursion of the main signal beyond the threshold.

75. The method according to claim 70, further comprising identifying a peak in the main signal, and wherein generating the excursion signal comprises generating the excursion signal according to at least one of the magnitude and the occurrence of the peak.

76. The method according to claim 75, wherein the peak comprises a set of three consecutive samples, wherein the middle sample has a higher magnitude than the first and third samples.

77. The method according to claim 75, further comprising adjusting the magnitude of the excursion signal according to the threshold, and wherein the threshold comprises a selected threshold from a plurality of thresholds.

78. The method according to claim 75, further comprising adjusting the magnitude of the excursion signal according to the magnitude of a proximate peak to the peak.

79. The method according to claim 78, wherein the proximate peak is defined according to a selected range of samples from the peak.

80. The method according to claim 78, wherein adjusting the magnitude of the excursion signal includes adjusting the magnitude of the excursion signal according to the relative magnitudes of the proximate peak and the peak.

81. The method according to claim 64, further comprising compensating for magnitude changes in the main signal.

82. A communication system, comprising:
an excursion signal generator configured to identify an excursion in a first signal exceeding a threshold, wherein the excursion signal generator comprises a peak identification system configured to identify a peak in the first signal and a waveform generator responsive to the peak identification system and configured to generate the excursion signal according to at least one of the magnitude and the occurrence of the peak, wherein the peak comprises a set of three consecutive samples and wherein the middle sample has a higher magnitude than the first and third samples;
an excursion reducer responsive to the excursion signal generator and configured to subtract the excursion signal from the first signal; and
a receiver configured to receive the first signal.

83. A communication system, comprising:
a transmitter, comprising:
an excursion signal generator configured to identify an excursion in a first signal exceeding a threshold, wherein the excursion signal generator comprises a peak identification system configured to identify a peak in the first signal and a waveform generator responsive to the peak identification system and configured to generate the excursion signal according to at least one of the magnitude and the occurrence of the peak, wherein the waveform generator comprises a peak response system configured to generate the excursion signal and a scaling system configured to adjust the magnitude of the excursion signal;
an excursion reducer responsive to the excursion signal generator and configured to subtract the excursion from the first signal; and
a receiver configured to receive the first signal.

84. The communication system according to claim 83, wherein the scaling system comprises a storage system storing a lookup table.

85. The communication system according to claim 83, wherein the scaling system is configured to adjust the magnitude of the excursion signal according to the threshold, and wherein the threshold comprises a selected threshold from a plurality of thresholds.

86. The communication system according to claim 83, wherein the scaling system is configured to adjust the magnitude of the excursion signal according to the magnitude of a proximate peak to the peak.

87. The communication system according to claim 86, wherein the proximate peak is defined according to a selected range of samples from the peak.

88. The communication system according to claim 86, wherein the scaling system is configured to adjust the magnitude of the excursion signal according to the relative magnitudes of the proximate peak and the peak.

89. A signal processing system, comprising:
an excursion signal generator configured to identify an excursion signal in a main signal, wherein the excursion signal generator comprises a peak identification system configured to identify a peak in the main signal and a waveform generator responsive to the peak identification system and configured to generate the excursion signal according to at least one of the magnitude and the occurrence of the peak, wherein the peak comprises a set of three consecutive samples, wherein the middle sample has a higher magnitude than the first and third samples; and
an excursion signal reducer configured to subtract the excursion from the main signal.

90. A signal processing system, comprising:
an excursion signal generator configured to identity an excursion signal in a main signal, wherein the excursion signal generator comprises a peak identification system configured to identify a peak in the main signal and a waveform generator responsive to the peak identification system and configured to generate the excursion signal according to at least one of the magnitude and the occurrence of the peak, wherein the waveform generator comprises a peak response system configured to generate the excursion signal and a scaling system configured to adjust the magnitude of the excursion signal; and
an excursion signal reducer configured to subtract the excursion signal from the main signal.

91. The signal processing system according to claim 90, wherein the scaling system comprises a storage system storing a lookup table.

92. The signal processing system according to claim 90, wherein the scaling system is configured to adjust the magnitude of the excursion signal according to a signal magnitude threshold, and wherein the threshold comprises a selected threshold from a plurality of thresholds.

93. The signal processing system according to claim 90, wherein the scaling system is configured to adjust the magnitude of the excursion signal according to the magnitude of a proximate peak to the peak.

94. The signal processing system according to claim 93, wherein the proximate peak is defined according to a selected range of samples from the peak.

95. The signal processing system according to claim 93, wherein the scaling system is configured to adjust the magnitude of the excursion signal according to the relative magnitudes of the proximate peak and the peak.

96. A transmitter system, comprising:
an excursion signal generator configured to identify an excursion signal in a main signal, wherein the excursion signal generator comprises a peak identification system configured to identify a peak in the main signal and a waveform generator responsive to the peak identification system and configured to generate the excursion signal according to at least one of the magnitude and the occurrence of the peak, wherein the peak comprises a set of three consecutive samples, wherein the middle sample has a higher magnitude than the first and third samples;

an excursion signal reducer configured to subtract the excursion signal from the main signal; and an amplifier configured to amplify the signal.

97. A transmitter system, comprising:

an excursion signal generator configured to identify an excursion in a main signal, wherein the excursion signal generator comprises a peak identification system configured to identify a peak in the main signal and a waveform generator responsive to the peak identification system and configured to generate the excursion signal according to at least one of the magnitude and the occurrence of the peak, wherein the waveform generator comprises a peak response system configured to generate the excursion signal and a scaling system configured to adjust the magnitude of the excursion signal;

an excursion reducer configured to subtract the excursion signal from the main signal; and an amplifier configured to amplify the signal.

98. The transmitter system according to claim 97, wherein the scaling system comprises a storage system storing a lookup table.

99. The transmitter system according to claim 97, wherein the scaling system is configured to adjust the magnitude of the excursion signal according to a signal magnitude threshold, and wherein the threshold comprises a selected threshold from a plurality of thresholds.

100. The transmitter system according to claim 97, wherein the scaling system is configured to adjust the magnitude of the excursion signal according to the magnitude of a proximate peak to the peak.

101. The transmitter system according to claim 100, wherein the proximate peak is defined according to a selected range of samples from the peak.

102. The transmitter system according to claim 100, wherein the scaling system is configured to adjust the magnitude of the excursion signal according to the relative magnitudes of the proximate peak and the peak.

103. A method for processing signals, comprising:

identifying an excursion in a main signal, wherein identifying the excursion includes calculating a magnitude of the main signal, comparing the magnitude to a threshold and generating an excursion signal according to the comparison of the magnitude to the threshold, and wherein generating the excursion signal comprises identifying a peak in the main signal and generating the excursion signal according to at least one of the magnitude and the occurrence of the peak, wherein the peak comprises a set of three consecutive samples, wherein the middle sample has a higher magnitude than the first and third samples; and subtracting the excursion signal from the main signal.

104. A method for processing signals, comprising:

identifying an excursion in a main signal, wherein identifying the excursion signal includes calculating a magnitude of the main signal, comparing the magnitude to a threshold and generating an excursion signal according to the comparison of the magnitude to the threshold, and wherein generating the excursion signal comprises identifying a peak in the main signal and generating the excursion signal according to at least one of the magnitude and the occurrence of the peak;

adjusting the magnitude of the excursion signal according to the relative magnitudes of a proximate peak and the peak; and subtracting the excursion signal from the main signal.

* * * * *